(12) United States Patent
Dotan et al.

(10) Patent No.: US 9,467,630 B2
(45) Date of Patent: Oct. 11, 2016

(54) SYSTEM FOR FACILITATING SELECTION OF COLOR CHANGING EYEWEAR LENSES AND WINDOWS

(71) Applicant: KiloLambda Technologies Ltd., Tel Aviv (IL)

(72) Inventors: Ido Dotan, Givatayim (IL); Noam Gross, Kiryat Ono (IL); Ariela Donval, Rosh Haayin (IL); Doron Nevo, Ra'anana (IL); Moshe Oron, Rehovot (IL)

(73) Assignee: KILOLAMBDA TECHNOLOGIES LTD., Tel Aviv (IL)

( * ) Notice: Subject to any disclaimer, the term of this patent is extended or adjusted under 35 U.S.C. 154(b) by 124 days.

(21) Appl. No.: 14/047,680

(22) Filed: Oct. 7, 2013

(65) Prior Publication Data

US 2015/0097855 A1    Apr. 9, 2015

(51) Int. Cl.

| G06T 11/60 | (2006.01) |
|---|---|
| B60J 3/04 | (2006.01) |
| G02F 1/01 | (2006.01) |

(Continued)

(52) U.S. Cl.
CPC ............ *H04N 5/272* (2013.01); *B60J 3/04* (2013.01); *G02B 5/23* (2013.01); *G02C 7/10* (2013.01); *G02C 7/102* (2013.01); *G02C 13/003* (2013.01); *G02F 1/0147* (2013.01); *G06T 11/001* (2013.01); *G06T 11/60* (2013.01); *H04N 2005/2726* (2013.01)

(58) Field of Classification Search
CPC ....... G06T 11/00; G06T 11/60; G06T 19/00; G06T 17/00; G06T 11/001; A41H 3/007; G09G 5/06; G09G 5/02; G09G 3/2003; G06Q 30/02
See application file for complete search history.

(56) References Cited

U.S. PATENT DOCUMENTS

| 4,300,821 A | 11/1981 | Mignen |
|---|---|---|
| 5,232,637 A | 8/1993 | Dasher et al. |

(Continued)

FOREIGN PATENT DOCUMENTS

| JP | H11353353 | 12/2009 |
|---|---|---|
| WO | WO 2013/098707 | 7/2013 |

OTHER PUBLICATIONS

PCT International Search Report for corresponding International Application No. PCT/IB2014/002050, mailed Dec. 19, 2014, (4 pages).

(Continued)

*Primary Examiner* — Todd Buttram

(57) ABSTRACT

A system for facilitating a consumer's selection of customized color-changing lenses for eyewear, or windows, captures a digital color image of at least the face of the consumer and displays that color image to the consumer on a video display while superimposing a pair of lenses over the eyes. The display simulates the color of the superimposed lenses when made of a selected photochromic or thermochromic material. The color of the superimposed lenses is changeable, in response to consumer-controlled inputs, over a range between (a) an initial color for the lenses when subjected to at least one of (i) a first predetermined temperature and (ii) a first predetermined light condition, and (b) a final color for said lenses when subjected to at least one of (i) a second predetermined temperature higher than said first predetermined temperature and (ii) a second predetermined light condition brighter than said first predetermined light condition.

10 Claims, 3 Drawing Sheets

(51) Int. Cl.
*G02B 5/23* (2006.01)
*G06T 11/00* (2006.01)
*G02C 7/10* (2006.01)
*H04N 5/272* (2006.01)
*G02C 13/00* (2006.01)

(56) References Cited

U.S. PATENT DOCUMENTS

| | | | |
|---|---|---|---|
| 6,095,650 A * | 8/2000 | Gao et al. | 351/227 |
| 6,533,418 B1 | 3/2003 | Izumitani et al. | |
| 7,014,314 B1 * | 3/2006 | Kamata et al. | 351/159.66 |
| 7,665,843 B2 * | 2/2010 | Xie | 351/200 |
| 2003/0123026 A1 | 7/2003 | Abitbol | |
| 2004/0004633 A1 * | 1/2004 | Perry et al. | 345/728 |
| 2006/0244909 A1 * | 11/2006 | Maki et al. | 351/163 |
| 2007/0052922 A1 | 3/2007 | King | |
| 2008/0288369 A1 * | 11/2008 | Hunter | 705/27 |
| 2013/0132898 A1 | 5/2013 | Cuento | |
| 2013/0142948 A1 * | 6/2013 | Ohta et al. | 427/164 |
| 2013/0147725 A1 * | 6/2013 | Chu et al. | 345/173 |
| 2015/0061166 A1 * | 3/2015 | Van De Vrie et al. | 264/1.7 |

OTHER PUBLICATIONS

PCT Written Opinion for corresponding International Application No. PCT/IB2014/002050, mailed Dec. 19, 2014, (7 pages).

* cited by examiner

SYSTEM FOR FACILITATING SELECTION OF COLOR CHANGING EYEWEAR LENSES AND WINDOWS

FIELD OF THE INVENTION

The present invention relates to the selection of colors of eyewear lenses and windows, and, more particularly, to eyewear lenses and windows that change their transmitted and reflected color or shade, in response to changes in the flux of the solar impinging light and/or the environmental temperature of the lenses.

BACKGROUND OF THE INVENTION

Techniques are known in which the portrait of an eyeglass consumer is captured with a digital camera, the characteristics of the facial features are analyzed using predetermined software, and the form of the eyeglasses is designed by applying predetermined design rules. The eyeglass designs are determined without consideration of the differences in the eyeglass wearers' facial features or personal preferences. U.S. Pat. No. 6,533,418 B1 (Izumitani et al.) describes a system which enables a consumer to able to select many more parameters, resulting in an eyeglass design that better suits the facial features of the eyeglass wearer but with a single color or shade.

For eyewear users, particularly sunglasses but also goggles, visors and helmets, the facial features as well as color of the iris, skin and hair call for a color or shade selection that fits the iris, skin and hair color. This selection is highly dependent on the average ambient lighting level, e.g., one color fits nicely in partial darkness and a second color fits nicely in full sun. This calls for color-changing eyewear lenses made-to-order, to fit both conditions.

For aesthetic and utility reasons, some people would like their glasses to have a preferable color or shade when used indoor or in low sun light flux and have a different color or shade when used outdoors or in high sun light flux.

Most common eyewear have usually a certain permanent color or shade having a predetermined optical density that is constant during the eyewear lifetime.

Some of the eyewear have a permanent color or shade, but also have a variable optical density that changes when exposed to, e.g., ultra-violet (UV) light. These are called photochromic glasses, that become less transmissive when exposed to the activating light.

Transparent materials that change their color or shade when exposed to light are known as photochromic materials. Some plastic ophthalmic lenses involve embedding a solid layer of photochromic mineral glass within the bulk of an organic lens material. Examples include U.S. Pat. No. 5,232,637 (Dasher et al.) that teaches a method of producing a glass-plastic laminated ophthalmic lens structure, and U.S. Pat. No. 4,300,821 (Mignen et al.) that teaches an ophthalmic lens made of organic material having at least one layer of photochromic mineral glass within its mass to impart photochromic properties to the lens.

Transparent materials that change their color or shade when exposed to temperature changes are known as thermochromic materials. The thermochromic dyes commonly used are spirolactones, fluorans, spiropyrans and others.

The present invention relates to the colors of eyewear lenses, and more particularly, to eyewear lenses having a change in their transmitted and reflected color or shade, where the change is due to changes in the flux of the solar impinging light and/or the environmental temperature of the glasses. The invention is also applicable to color-changing windows, including car windows.

SUMMARY OF INVENTION

In accordance with one embodiment, a system is provided for facilitating a consumer's selection of customized color-changing lenses for eyewear. The system captures a digital color image of at least the face of the consumer, including the eyes of the consumer, and displays that color image to the consumer on a video display while superimposing a pair of lenses over the eyes in the image. The display simulates the color of the superimposed lenses when made of a selected photochromic or thermochromic material. The color of the superimposed lenses is changeable, in response to consumer-controlled inputs, over a range between (a) an initial color for the lenses when subjected to at least one of (i) a first predetermined temperature and (ii) a first predetermined light condition, and (b) a final color for said lenses when subjected to at least one of (i) a second predetermined temperature higher than said first predetermined temperature and (ii) a second predetermined light condition brighter than said first predetermined light condition. The display also simulates the color of the superimposed lenses when the selected photochromic or thermochromic material is mixed or layered with, in response to consumer-controlled inputs, at least one of a plurality of different dye materials.

In one implementation, the customer selects, via the display, desired colors for the lenses in eyewear purchased by the customer, and the customer's selections are communicated to a production facility. The customer's color selections are translated into specifications for the material(s) to be used in fabricating the lenses for the eyewear purchased by the consumer.

One embodiment provides eyewear with lenses that have a customized initial color and a customized final color or shade when exposed to sunlight or high temperature. The lenses thus have the capability to build the colors of the user's choice using a computerized application, followed by the transmission of this information to a production laboratory for execution.

Another embodiment provides a color-changing eyewear lenses made-to-order system in which an operator determines lens color or shade specifications necessary for ordering eyewear or windows, with an interactive system including a computer-controlled display screen. Combinations of a plurality of basic colors or shades can be simulated on the display screen, and the optimum color reflecting the consumer's color or shade preferences can be selected by the consumer making arbitrary combinations of colors or shades for color-changing lenses, yielding a design that reflects the consumer's preferences. The desired lenses or window can be selected and ordered quickly using only the procedures deemed necessary by the operator.

In one implementation, the initial colors are simulated for an initial, low external temperature level (e.g., 20° C.), and the final colors are simulated for a final, high temperature level (e.g., 35° C.), and a desired color combination is designed using mixtures of basic colors, with the lens color changing between the two extreme conditions.

A further embodiment provides a process of ordering and production of the color-changing eyewear lenses or windows. The method of self-design of the-color changing eyewear lenses or windows, where the initial and the final color of the color changing eyewear lenses or windows are selected by the customer, is followed by transmitting corresponding manufacturing data to the manufacturing facility.

Additional aspects of the invention will be apparent to those of ordinary skill in the art in view of the detailed description of various embodiments, which is made with reference to the drawings, a brief description of which is provided below.

BRIEF DESCRIPTION OF THE DRAWINGS

The invention may best be understood by reference to the following description taken in conjunction with the accompanying drawings, in which.

DETAILED DESCRIPTION OF THE ILLUSTRATED EMBODIMENTS

Although the invention will be described in connection with certain preferred embodiments, it will be understood that the invention is not limited to those particular embodiments. On the contrary, the invention is intended to cover all alternatives, modifications, and equivalent arrangements as may be included within the spirit and scope of the invention as defined by the appended claims.

Figure 1:
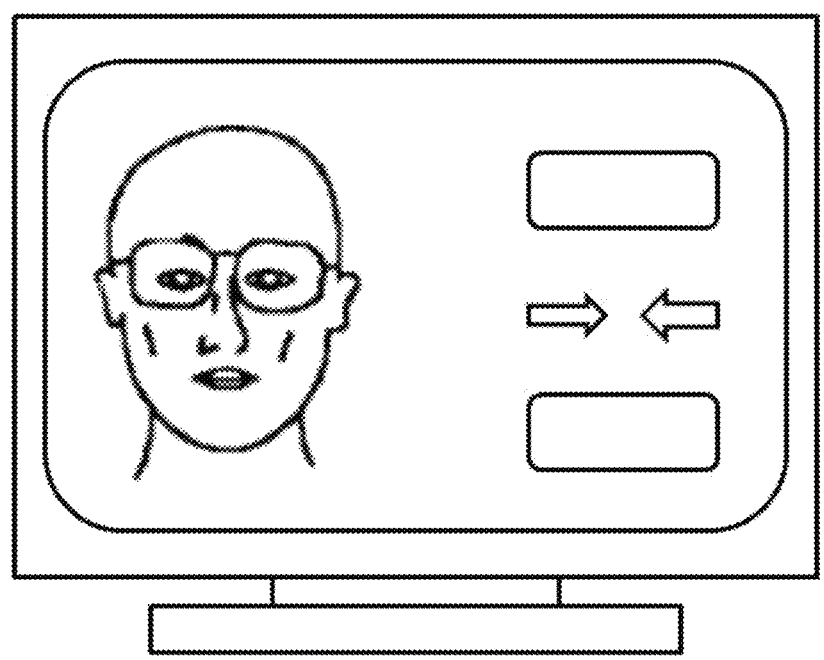
FIG. 1 depicts a video display that includes a color image of a customer's face with superimposed glasses for color selection.

FIG. 1 depicts a video display that includes a color picture of customer's face with superimposed glasses for color selection. The first image displayed shows the customer as he or she appears regularly on a mirror, wearing glasses with totally transparent lenses. The customer is able to select, using the interactive computer screen, the colors of the glasses that complement the customer's iris, skin and hair colors. The selection procedure is as follows:

1. Initial color selection: the customer is able to select, using the interactive computer screen, the initial color of the lenses at room temperature without exposure to external strong sun light.
2. Final color selection: the customer is able to select, using the interactive computer screen, the final color of the lenses at high temperatures, e.g., 35° C. temperature, or when exposed to external strong sun light.

Figure 2:
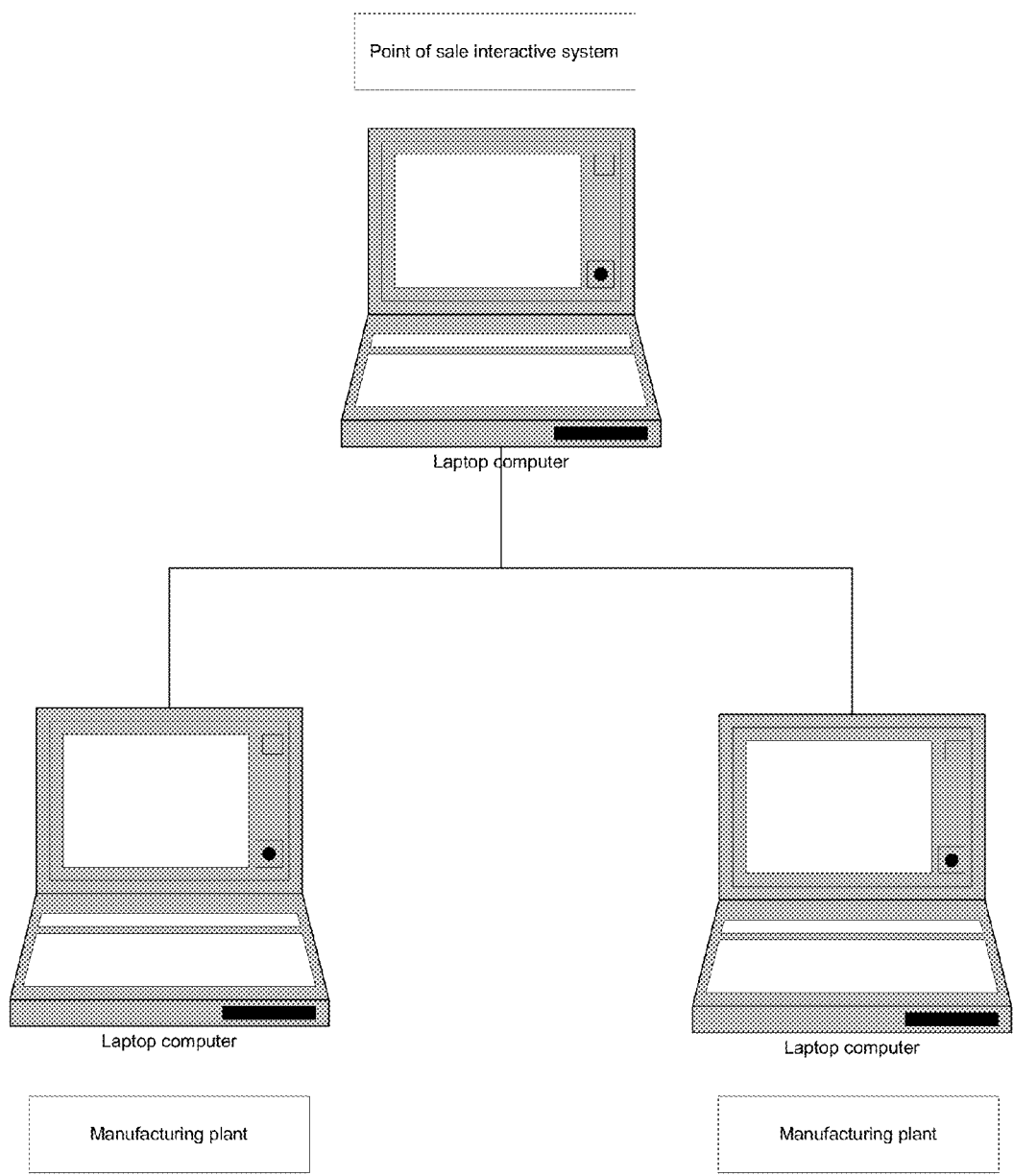
FIG. 2 depicts an example of a computer network for facilitating color selection by customer and communicating that selection to a production facility.

FIG. 2 depicts an example of a computer network for facilitating color selection by customer at the point of sale, and communicating that selection to the manufacturing plant.

Figure 3:
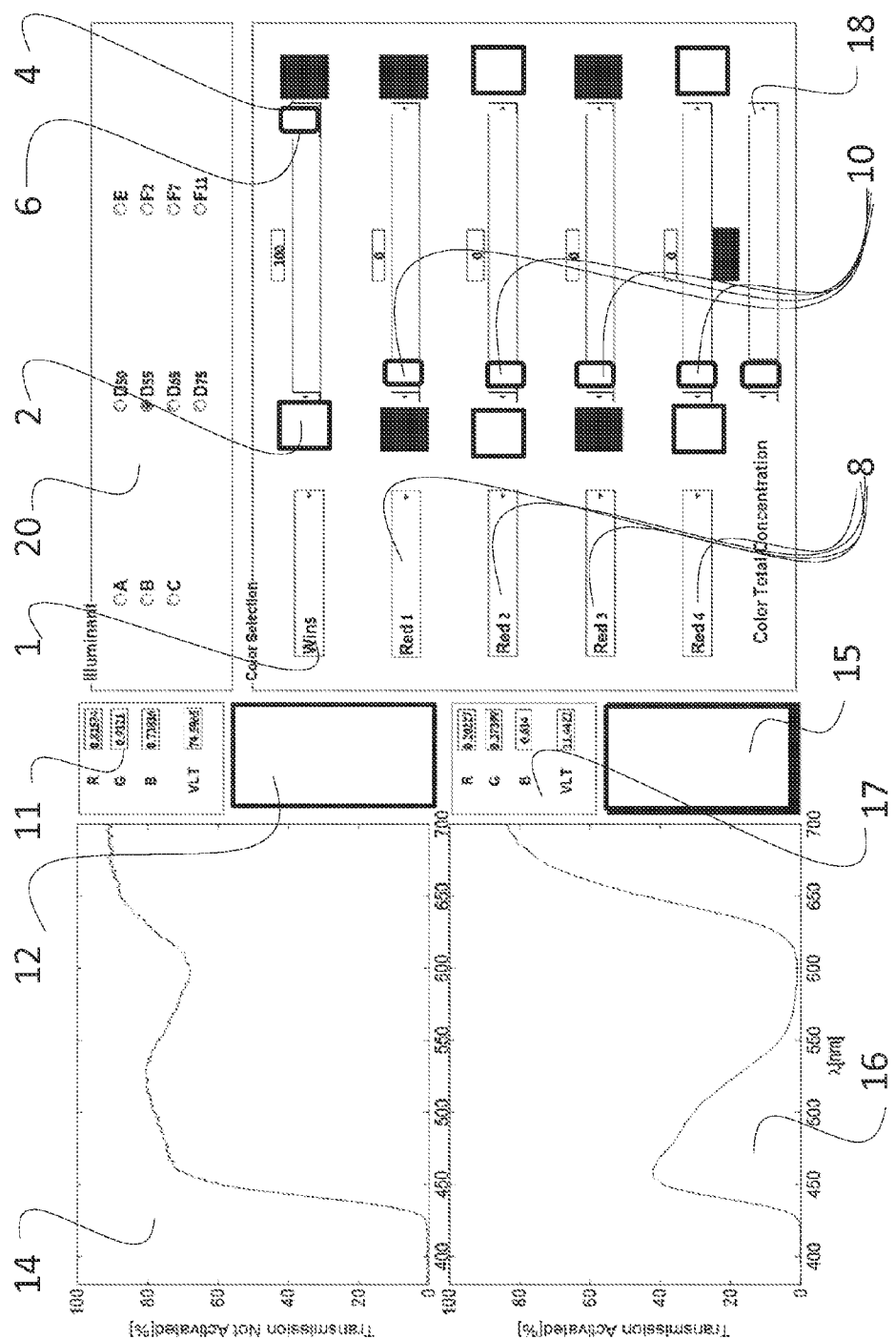
FIG. 3 depicts a screen shot of an interactive video display for use by a consumer to view multiple available lens or window colors and how they change in response to different light conditions, to facilitate the selection of a desired color and shade for the lenses in eyewear, or for windows, or being purchased by the consumer.

FIG. 3 depicts a screen shot of an interactive video display (e.g., using a display with a touch screen) for use by a consumer (e.g., in a retail store) to facilitate the selection of the color of the lenses in eyewear (e.g., sunglasses) being purchased by the consumer. The display enables the consumer to view his or her own facial image with superimposed eyewear containing lenses with superimposed colors that simulate the actual color of a selected lens material under different light conditions. A series of consumer-actuated adjustments permit the consumer to change the composition of the simulated lenses, and see how the lens color or shade changes under the different light conditions.

In the particular embodiment illustrated in FIG. 3, the simulated colors are those of a single, active photochromic dye with multiple layers, or a mixture, of fixed color dyes. Shown is a simulation of the colors of a single photochromic dye, selected from a list accessible in a window 1. Two color panels 2 and 4, to the right of the window 1, simulate the non-activated and activated colors, respectively, of a lens containing the selected photochromic dye. The color simulated in panel 2 is the color of the lens when subjected to a first level of light that does not activate the photochromic dye, and the color simulated in panel 4 is the color of the lens when subjected to a higher (brighter) level of light that activates the photochromic dye. The slide 6 between the two color panels 2 and 4 can be moved, e.g., by engaging the slide 6 on the touch screen and moving it left or right, for quantity control.

The activating solar light reaches in full to the photochromic dye that is either mixed into a fixed-dye layer or is an embedded into a separate layer. Following the customer's selection of material and quantity, an RGB (Red-Green-Blue) value is calculated for the simulated transmission spectra and displayed in the R, G and B fields, with correspondence to the tristimulus values. For the non-activated (clear) state, the RGB value is displayed in the R, G and B fields in a window 11, and the transmitted color is displayed as color in a window 12, and as optical spectrum in the visible light (400 to 700 nanometers wavelength range) in a window 14. For the activated state, the RGB value is displayed in the R, G and B fields in a window 17, and the transmitted color is displayed as color in a window 15, and as optical spectrum in the visible range (400 to 700 nanometers wavelength range) in a window 16. Windows 11 and 17 also display the VLT (Visible Light Transmittance) values as the opacity of the displayed color, as standalone, or as a top layer to the user's facial image as it appears in FIG. 1.

The display in FIG. 3 also permits simulation of the colors produced by mixing different amounts of one or more fixed color dyes with the selected photochromic dye. In the illustrated embodiment, four fixed dyes can be selected from lists accessible in four different windows 8. The quantity of each selected dye can be adjusted by using the four corresponding slides 10. An additional slide 18 can be used to adjust all the colors together for a total shade level. Adjustments can be made for each of the photochromic and fixed-color dyes separately or by using a predetermined color lookup table (not appearing on the illustrative display). There are a large number of combinations of 5 colors with 5 unknown concentrations, and a lookup table can facilitate the attainment of any desired shade. The lookup table can be created, with the pre-calculated RGB and VLT values, for several concentration combinations. This provides a large database of initial and activated colors, as well as the VLT in each case. Then the user can simply choose the desired colors for initial and activated states from the color selection.

Since one must take into account the fact that different lighting conditions will result in different color perception, the user should also specify the desired lighting conditions, which are displayed in window 20 in FIG. 3. There is an option to change the scene lighting (illuminant), and to enable the user to visualize his or her selected combination, in different lightings. A standard illuminant is a theoretical source of visible light with a spectral power distribution which is well known and published (see, e.g. http://en.wikipedia.org/wiki/Standard_illuminant). Standard illuminants provide a basis for comparing images or colors recorded under different lighting. There are the following sources:

A—intended to represent typical, domestic, tungsten-filament lighting

B and C—daylight as used in simulators

D—series of illuminants representing natural daylight.

E—equal-energy radiator

F—series of illuminants representing various types of fluorescent lighting

After the consumer has selected desired initial and final colors, those colors can be displayed on the image depicted in FIG. 1 to enable the consumer to see how those colors look on the consumer's own color image. The consumer can then opt to proceed with his or her purchase with the selected colors, or to return to the display of FIG. 3 to select different colors.

It will be understood that the embodiments described above are applicable to the selection of colors for color-changing windows, such as car windows, as well as for eyewear lenses It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

The invention claimed is:

1. A method of facilitating a consumer's selection of two-colored customized color-changing photochromic or thermochromic lenses for eyewear, said lenses having a first initial color at room temperature or at indoor lighting conditions;

and said lenses having a second activated color upon exposure to heat or sunlight; wherein a consumer may select said first color and said second color from a wide range of colors, each of said first and said second colors being selected independently from one another;

said method comprising:

capturing a digital color image of at least the face of the consumer, including the eyes of the consumer, displaying said color image to the consumer on a video display while superimposing over the eyes in said image a pair of lenses, wherein said displaying is comprised of the following steps:

a) allowing a consumer to select a first initial color for said colored lenses, said color to be present on said lenses at room temperature or at indoor lighting conditions;

b) allowing a consumer to select a second activated color to be present on said lenses upon exposure to heat or sunlight;

wherein said consumer may select said first color and said second color from a wide range of colors, and each of said first and said second colors may be selected by said consumer independently from one another;

and said selection is performed by said consumer selecting a color displayed on an electronic display, wherein said colors on said electronic display correspond to various mixtures and quantities of a plurality of fixed dyes, photothermic dyes and photochromic-dyes;

c) simulating on said display said selected first initial color of said superimposed lenses;

d) simulating on said display said selected second activated color of said superimposed lenses;

wherein said display permits simulation of the colors produced by mixing various amounts of one or more fixed-color-dyes with any selected photochromic dye or photothermic dye;

outputting said consumer selection.

2. The method of claim 1 which includes communicating to a production facility the customer's selection of said first initial color and said second activated color for the lenses in eyewear purchased by the customer, enabling customized manufacturing.

3. The method of claim 1 which includes translating the customer's selection of said first initial and said second activated color to a specification of one or more materials to be used in the lenses in eyewear purchased by the customer.

4. A system for facilitating a consumer's selection of customized two-colored color-changing or shade changing photochromic or thermochromic lenses for eyewear, said lenses having a first initial color at room temperature or at indoor lighting conditions, and said lenses having a second activated color upon exposure to heat or sunlight; said system comprising:

a digital camera for capturing a digital color image of at least the face of the consumer, including the eyes of the consumer, a video display, computer associated peripherals;

a processor interacting with said peripherals, and interacting with said video display, said processor including a memory device, a driver; said processor being in communication with said memory device, and being configured to:

capture a digital color image of at least the face of said consumer, including the eyes of said consumer, display said color image to the consumer on a video display while superimposing over the eyes in said image a pair of lenses, wherein said displaying is comprised of the following steps:

allowing said consumer to select a first initial color for said colored lenses, said color to be present on said lenses at room temperature or at indoor lighting conditions;

allowing said consumer to select a second activated color to be present on said lenses upon exposure to heat or sunlight;

wherein said consumer may select said first color and said second color from a wide range of colors, and each of said first and said second colors may be selected by said consumer independently from one another;

and said selection is performed by said consumer selecting a color on an electronic display, wherein said colors on said electronic display correspond to various mixtures and quantities of a plurality of fixed dyes, photothermic dyes and photochromic-dyes;

and said processor is further configured to output said consumer selection.

5. The system of claim 4 which includes a production facility that receives the customer's identification of said first and second selected colors for the lenses in eyewear purchased by the customer.

6. The system of claim 4 comprising an automatic translator for converting the customer's selection of said first and second colors to a specification of one or more materials to be used in the lenses in eyewear purchased by the customer.

7. The method of claim 1, wherein said outputting comprises communicating to a production facility the customer's identification of said first and second colors for the lenses in eyewear purchased by the customer, enabling customized manufacturing.

8. The system of claim 4 in which said first and second colors or shades correspond to the colors or shades produced by a lens containing at least one of a preselected thermochromic material, a preselected photochromic material and a fixed dye material.

9. The system of claim 4 which includes a production facility that receives the customer's selection of the first and second colors or shades for the lenses in eyewear purchased by the customer.

10. The method of claim 1 which includes fabricating a pair of lenses having said selected first and second colors.

\* \* \* \* \*